US007748638B2

(12) United States Patent
Hino et al.

(10) Patent No.: US 7,748,638 B2
(45) **Date of Patent: *Jul. 6, 2010**

(54) NON-CONTACT IC MODULE

(75) Inventors: Yoshiharu Hino, Ibaraki (JP); Kazuhiko Daido, Ibaraki (JP)

(73) Assignee: Hitachi Maxwell, Ltd., Ibaraki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/013,339

(22) Filed: Jan. 11, 2008

(65) Prior Publication Data

US 2008/0117118 A1 May 22, 2008

Related U.S. Application Data

(63) Continuation of application No. 09/769,293, filed on Jan. 26, 2001, now Pat. No. 7,334,734.

(30) Foreign Application Priority Data

Jan. 27, 2000 (JP) ............................ 2000-019042
Feb. 23, 2000 (JP) ............................ 2000-046325

(51) Int. Cl.
*G06K 19/06* (2006.01)

(52) U.S. Cl. ...................................... 235/492; 235/493

(58) Field of Classification Search ................. 235/436, 235/439, 441, 451, 487, 492, 493
See application file for complete search history.

(56) References Cited

U.S. PATENT DOCUMENTS

| | | | |
|---|---|---|---|
| 5,308,967 | A | 5/1994 | Jurisch et al. |
| 6,027,027 | A | 2/2000 | Smithgall |
| 6,069,564 | A | 5/2000 | Hatano et al. |
| 6,107,920 | A | 8/2000 | Eberhardt et al. |
| 6,160,526 | A | 12/2000 | Hirai et al. |
| 6,204,764 | B1 | 3/2001 | Maloney |
| 6,276,523 | B2 | 8/2001 | Sanders |
| 6,340,932 | B1 | 1/2002 | Rodgers et al. |
| 6,362,737 | B1 | 3/2002 | Rodgers et al. |
| 6,441,740 | B1 | 8/2002 | Brady et al. |
| 6,563,425 | B2 | 5/2003 | Nicholson et al. |
| 6,719,206 | B1 | 4/2004 | Bashan et al. |

*Primary Examiner*—Seung H Lee
(74) *Attorney, Agent, or Firm*—Birch, Stewart, Kolasch & Birch, LLP

(57) ABSTRACT

An accessed object having a non-contact IC module including a semiconductor device and a module-side antenna formed extending over two sides of an accessed object, wherein the module-side antenna consists of a first module-side antenna and a second module-side antenna continuous to the first module-side antenna, wherein the first module-side antenna secures a necessary antenna effective area by coming into face-to-face relation with a first apparatus-side antenna on communication apparatus to communicate with the accessed object, and wherein the second module-side antenna is disposed close to the second apparatus-side antenna in an access direction different from the direction in which the first apparatus-side antenna makes access to the accessed object.

14 Claims, 13 Drawing Sheets

NON-CONTACT IC MODULE

This application is a Continuation of application Ser. No. 09/769,293, filed on Jan. 26, 2001 now U.S. Pat. No. 7,334,734 the entire contents of which are hereby incorporated by reference and for which priority is claimed under 35 U.S.C. §120.

BACKGROUND OF THE INVENTION

The present invention relates to an accessed object that has provided thereon a non-contact IC module including a semiconductor device, such as an IC chip, and an antenna for radio communication, and more particularly concerns an accessed object adapted for easy detection and an accessed object accessible from a plurality of directions.

Among accessed objects, there is a type that has mounted thereon an IC module including a semiconductor device, such as an IC chip, and a radio communication antenna for use in managing and searching accessed objects and also for providing better security properties for accessed objects.

FIG. 1 is a diagram for explaining an accessed object. An IC module 101 in tag shape is mounted on the surface of the accessed object 100. As shown in FIG. 2, the IC module 101 has an IC chip 103 and a module-side coil antenna 104 formed together on a printed circuit board 102.

In data communication processing apparatus, such as a personal computer, on the other hand, an apparatus-side coil antenna 105 is provided (FIG. 1), and this apparatus-side coil antenna 105 is placed in face-to-face relation with and in proximity to the module-side antenna 104 on the accessed object 100 to make those antennas 105 and 104 electromagnetically coupled, and by this arrangement, a system is formed to read or write information on the IC chip 103.

When the prior-art IC module 101 is a quadrangle in a general shape, for example, the module-side antenna 104 has lines formed approximately evenly on the four sides with the same line width and the same line pitch as shown in FIG. 2.

Therefore, when access is made perpendicularly to the plane surface of the IC module 101, for example, by the apparatus-side antenna 105*a* as shown in FIG. 1, the coupling efficiency is high between the antennas 104 and 105*a*, so that information can be read or written on the IC chip 103 without any trouble.

However, when, for some reason, access is made to one side of the IC module 101 as by the apparatus-side antenna 105*b*, the coupling efficiency is low between the module-side antenna 104 on the IC module 101 and the apparatus-side antenna 105*b* in conjunction with magnetic flux distribution, with the result that trouble occurs in reading or writing information, reducing operational reliability.

In this case, it is necessary to change the posture of the accessed object 100 by 90° to make the surface of the IC module face the apparatus-side antenna 105*b* before information is read or written on the IC chip 103, and this handling of the accessed object is troublesome.

FIG. 3 is a diagram for explaining the prior-art accessed object. In this diagram, an accessed object 100 is shown which includes a tag-shaped non-contact IC module 101 having an IC chip and a coil antenna for radio communication formed on the plane surface thereof.

Meanwhile, a coil antenna for radio communication 106 is mounted also on the data processing apparatus, such as a personal computer. This system is formed such that the radio communication antenna of the IC module 101 attached to the accessed object 100 is brought into face-to-face relation to and in proximity to the radio communication antenna 106 to thereby electromagnetically couple the two antennas together, making it possible to read or write information on the IC chip in the non-contact IC module through the intermediary of those antennas.

In FIG. 3, the accessed object 100 has the IC module 101 mounted on one plane surface thereof. If information is exchanged by having the accessed object 100 laid on its side as shown on the right side in FIG. 3 so that the IC module 101 faces the coil antenna for radio communication, when the accessed object 100 stands upright as shown on the left side in FIG. 3, it is necessary to lay the accessed object 100 on its side so as to face the antenna 106, and this handling of the accessed object 100 is troublesome.

SUMMARY OF THE INVENTION

An object of the present invention is to eliminate the shortcoming of the prior art mentioned above and provide an accessed object having a non-contact IC module with improved handlability.

Another object of the present invention is to provide an accessed object having an IC module with higher operation reliability.

In order to achieve the above objects, the present invention has been made for accessed objects, such as cartridge type information recording media, which are fitted with a tag-shaped non-contact IC module including a semiconductor device, such as an IC chip, and an antenna for radio communication.

According to a first aspect of the present invention, one antenna for radio communication is provided extending over the two, vertical and horizontal, sides, for example, of an accessed object.

According to a second aspect of the present invention, in the first aspect, a semiconductor device and an antenna for radio communication, mentioned above, are provided on a flexible sheet, such as polyethylene terephthalate film or polyimide film and this sheet is bent and attached to the accessed object.

According to a third aspect of the present invention, in the second aspect, the semiconductor device is located away from the bent portion of the sheet.

According to a fourth aspect of the present invention, in the first or second aspect, the antenna for radio communication is provided near the corner portion of the accessed object.

According to a fifth aspect of the present invention, in any of the first to fourth aspects, the accessed object is contained in a casing, such as a cartridge case or a storage case, and the antenna for radio communication is arranged inside the casing.

According to a sixth aspect of the present invention, in the fifth aspect, the casing is opaque or translucent.

According to a seventh aspect of the present invention, in the first aspect, the accessed object is an information recording medium, such as a tape cartridge or a disk cartridge for recording information.

As mentioned above, because of the feature of the present invention that one antenna for radio communication is provided extending over the two sides, e.g., vertical and horizontal sides of the accessed object, this antenna is accessible from both the vertical and horizontal directions, which provides better handling.

According to the present invention, the module-side antenna comprises a first module-side antenna and a second module-side antenna connected to the first module-side antenna, wherein the first module-side antenna secures an antenna effective area by coming into face-to-face relationship with the first apparatus-side antenna in a first usage mode of the communication apparatus side, such as a personal computer, to communicate with the accessed object, and wherein the second module-side antenna is disposed close to the access direction of the second apparatus-side antenna, different from the access direction of the first apparatus-side antenna in a second usage mode of the communication apparatus side.

The accessed object may have an insertion recess provided in a specified position thereof and the non-contact IC module may be inserted into the insertion recess.

Alternatively, a slit may be provided in place of the insertion recess.

An erratic insertion preventive means may be provided at the insertion recess or the non-contact IC module.

The non-contact IC module may have a printed circuit board. The first module-side antenna may be formed on one side of the printed circuit board and the second module-side antenna may be formed on the other side of the printed circuit board, and the first module-side antenna may be connected to the second module-side antenna via a through-hole.

The non-contact IC module may have a printed circuit board. The first module-side antenna and one part of the second module-side antenna may be formed on one side of the printed circuit board and the other part of the second module-side antenna may be formed on the other side of the printed circuit board, and the one part of the second module-side antenna on the one side may be connected to the other part of the second module-side antenna via a through-hole.

The accessed object may be an information recording medium, such as a tape cartridge or a disk cartridge for recording information.

DESCRIPTION OF THE EMBODIMENTS

The present invention will now be described in detail in conjunction with what is presently considered as preferred or typical embodiments thereof by reference to the accompanying drawings.

Figure 1:
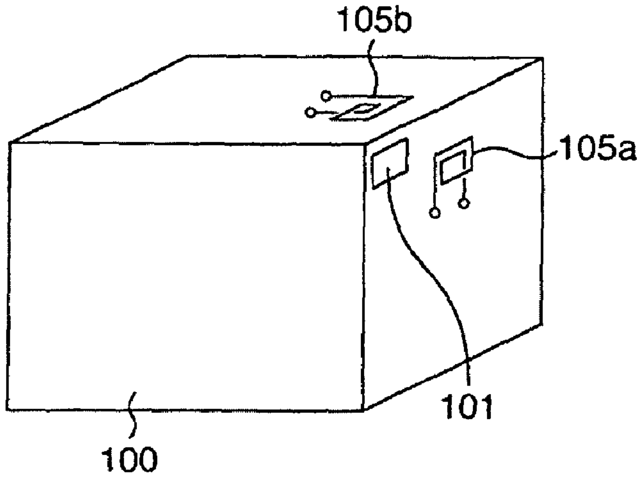
FIG. 1 is a diagram for explaining a prior-art accessed object.
Figure 4:
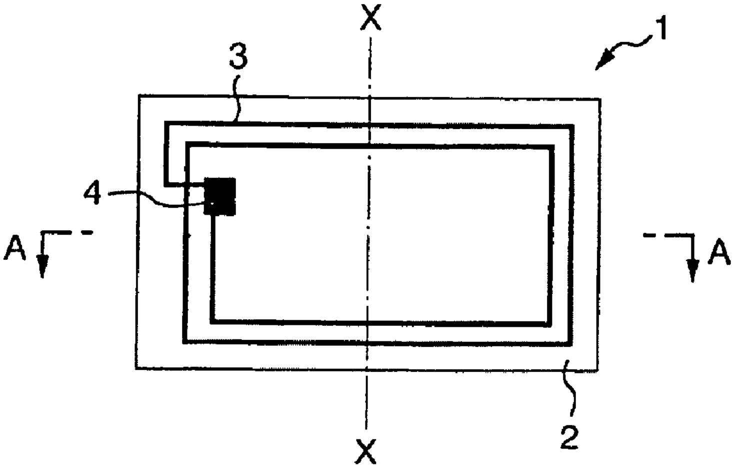
FIG. 4 is a plan view of a non-contact IC module used in a first embodiment of the present invention.
Figure 5:
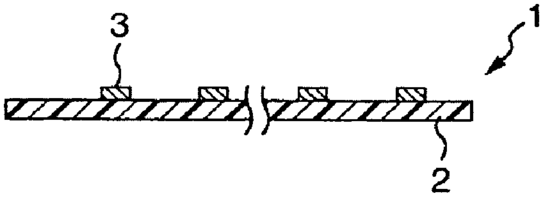
FIG. 5 is a partial sectional view, to an enlarged scale, taken on the line A-A in FIG. 4.
Figure 6:
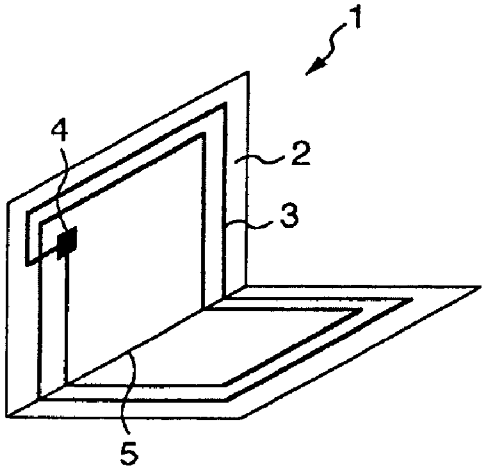
FIG. 6 is a perspective view of the IC module in FIG. 4, which has been bent at a right angle.
Figure 7:
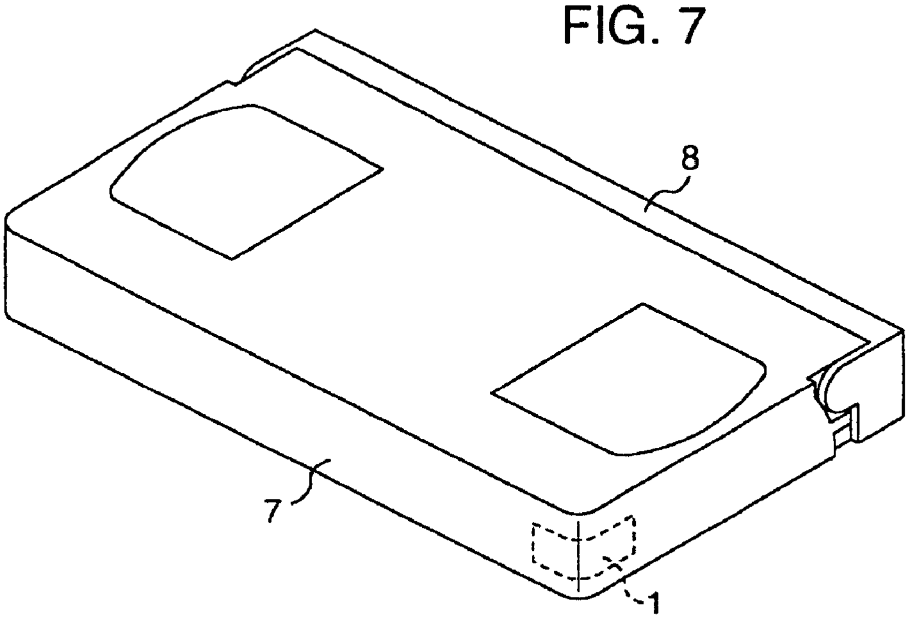
FIG. 7 is a perspective view of a tape cartridge in which the IC module shown in FIG. 4 is mounted.
Figure 8:
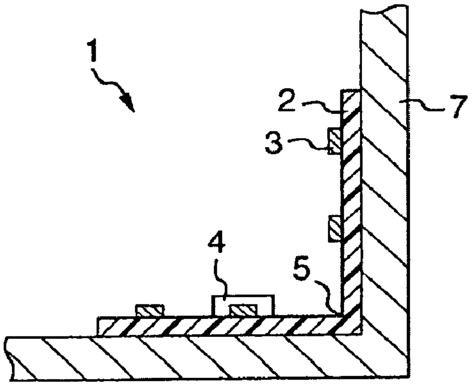
FIG. 8 is a partial sectional view, to an enlarged scale, of the tape cartridge shown in FIG. 7.

FIG. 4 is a plan view of a non-contact IC module used in a first embodiment of the present invention, FIG. 5 is a partial sectional view, to an enlarged scale, taken on the line A-A in FIG. 1, FIG. 6 is a perspective view showing the IC module, which has been bent at a right angle, FIG. 7 is a perspective view of a tape cartridge in which the IC module is mounted, and FIG. 8 is a partial sectional view, to an enlarged scale, of the tape cartridge.

As shown in FIGS. 4 and 5, the non-contact IC module, which in a tag shape, has a radio-communication coil antenna 3 of aluminum or copper, for example, formed on a flexible sheet, such as polyethylene terephthalate film or polyimide film. This antenna is connected at two ends to an IC chip 4 mounted on the sheet 2.

Being flexible, the sheet 2 can be bent easily to match the shape of an accessed object, to which the sheet is attached. In this embodiment, as shown in FIGS. 4 and 6, to attach the IC module to the inside wall of the cartridge case of a tape cartridge, the IC module is bent substantially at a right angle along the line X-X of FIG. 4 with the antenna 3 and IC chip 4 located at the inner side. As shown in FIG. 6, the IC chip 4 is located in a position away from the bent portion 5 (on the line X-X in FIG. 4) of the sheet 2.

As shown in FIG. 7, the tape cartridge 6 mainly comprises an opaque or translucent cartridge case 7, a rotatable cover 8 for a tape ejection port (not shown) of the cartridge case 7, and magnetic tape (not shown) stored in the cartridge case 7.

The IC module 1 is attached, extending over the two sides, to one inside corner of the rear side of the cartridge case 7 where the rotatable cover is not attached. As shown in FIG. 8, this IC module 1 has its sheet 2 attached to the cartridge case 7 by appropriate means, such as adhesive double-coated tape, glue or ultrasonic fusion.

Figure 9:
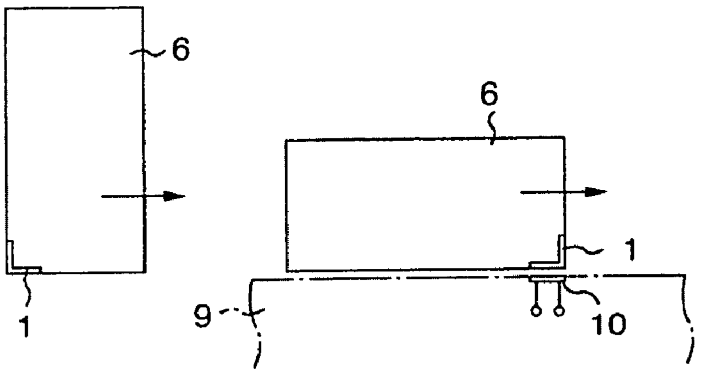
FIG. 9 is an explanatory diagram showing the state that the accessed object, shown in FIG. 7, is processed in data processing apparatus.

FIG. 9 is a diagram showing how a tape cartridge 6 is accessed. The data processing apparatus 9, such as a personal computer, has mounted thereon a radio communication antenna 10 in a shape substantially the same as the radio communication antenna 3. By having the radio communication antenna 10 brought into face-to-face relation with the radio communication antenna 3 on the IC module 1, the two antennas 3,10 are electromagnetically coupled, and through those antennas 3,10, desired information can be read from or written into the IC chip 4 in the non-contact IC module 1.

The tape cartridge 6 can be accessed from the radio communication antenna 10 whether the tape cartridge 6 is laid sideways as shown on the right side of FIG. 9 or it is placed upright as shown on the left side.

Figure 10:
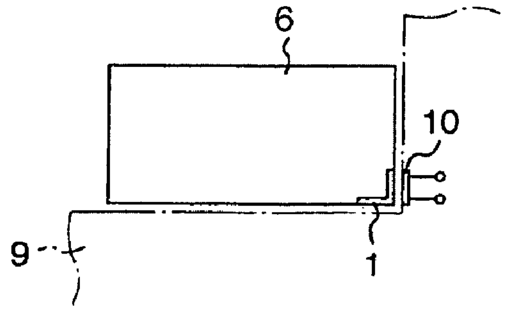
FIG. 10 is an explanatory diagram showing a modification of the data processing apparatus.
Figure 11:
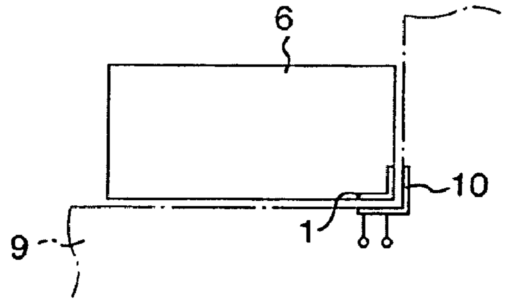
FIG. 11 is an explanatory diagram showing another modification of the data processing apparatus.

FIGS. 10 and 11 shows modifications of the configuration of the radio communication antenna 10 mounted on the data processing apparatus 9. In FIG. 10, the radio communication antenna 10 is provided in vertical position so as to face the vertical portion of the L-shaped radio communication antenna 1. FIG. 11 shows the L shaped radio communication antenna 10, which is made of one antenna coil bent in L shape consisting of a vertical portion and a horizontal portion or which is made of two coils, one formed in a horizontal position and the other formed in a vertical position. This L-shaped radio communication antenna 10 in its entirety squarely faces the radio communication antenna 1 bent in L shape.

Figure 12:
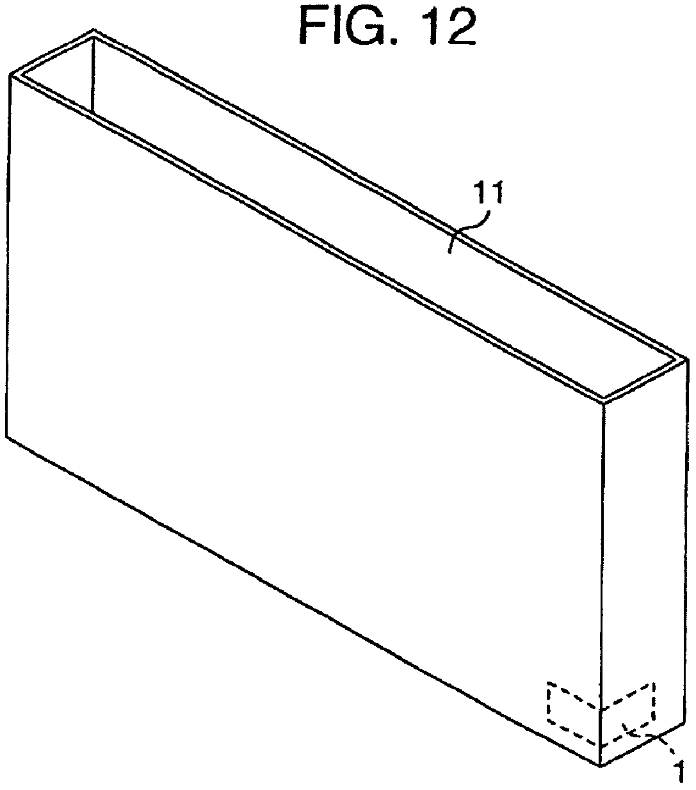
FIG. 12 is a perspective view of the accessed object according to a second embodiment of the present invention.
Figure 13:
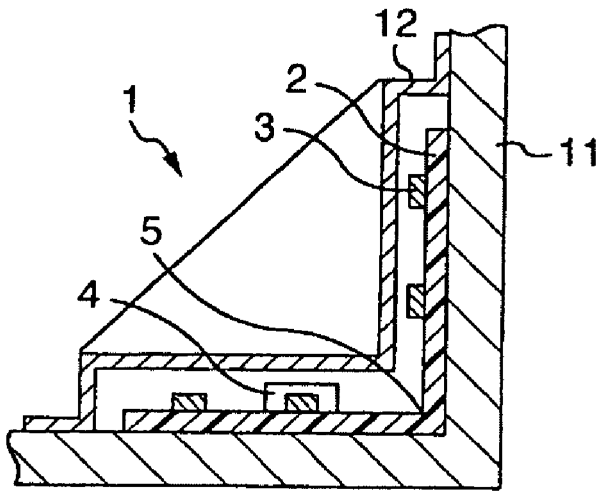
FIG. 13 is a sectional view to a partially enlarged scale of the accessed object in FIG. 12.

FIGS. 12 and 13 shows a second embodiment of the present invention. In this example, the non-contact IC module 1 is attached to the inside walls at one corner at the bottom side of an information recording medium, such as a tape cartridge or a disk cartridge, a book or a record file, or a storage casing for other articles.

The non-contact IC module 1 has an IC chip 4 mounted on a flexible sheet 2, and the radio communication antenna 3 formed on the sheet 2 is connected at two ends to the IC chip 4. The non-contact IC module 1 is bent in L shape to match the corner portion of the storage case 11 with the sheet 2 located at the outer side, and then attached to the vicinity of the corner of the storage case 11. The non-contact IC module 1 is covered with a protective member 12 formed of synthetic resin to protect the non-contact IC module 1 (sheet 1, radio communication antenna 3, IC chip 4) against G direct contact with an article stored in the storage case 11.

The previous embodiment has been described taking a magnetic tape cartridge and a storage case as examples. However, the present invention is not limited to these, but may be applied to other products or parts, such as optical disk cartridges, toner cartridges, ink ribbon cartridges and battery packs.

According to the present invention, one radio communication antenna is mounted extending over two, vertical and horizontal, surfaces of the accessed object. Therefore, the antenna is accessible from the vertical and horizontal directions regardless of the posture of the accessed object, which provides better, convenient handling.

According to the present invention, the semiconductor device and the radio communication antenna are mounted on a flexible sheet and this sheet is bent and attached to the accessed object. Therefore, the non-contact IC module can be installed easily to fit the shape of the accessed object and is convenient for use.

Further, according to the present invention, the semiconductor device is located away from the bent portion of the sheet. Therefore, the semiconductor device and the connections of the radio communication antenna can be prevented from being damaged when the sheet is bent.

Further, according to the present invention, the radio communication antenna is mounted near a corner portion of the accessed object. Therefore, as the corner portion of the accessed object is made to come into contact with the corner portion of the data processing apparatus, the corresponding relation can be correctly maintained between the radio communication antenna of the accessed object and the radio communication antenna of the data processing apparatus, resulting in good sensitivity in exchanging information.

Further, according to the present invention, the accessed object has a casing, the radio communication antenna is installed inside the casing, so that the antenna is protected by the casing. Therefore, the radio communication antenna is free from separation or dropping off from the casing owing to long-term use, and the reliability can be improved and service life can be prolonged.

Further, according to the present invention, the casing is opaque or translucent, for which reason the external appearance is not affected by internal mounting of the radio communication antenna.

Another feature of the present invention is that if the accessed object is an information recording n-medium, it is easy to execute processes such as searching and managing the information recording media by means of radio communication antennas.

Figure 14:
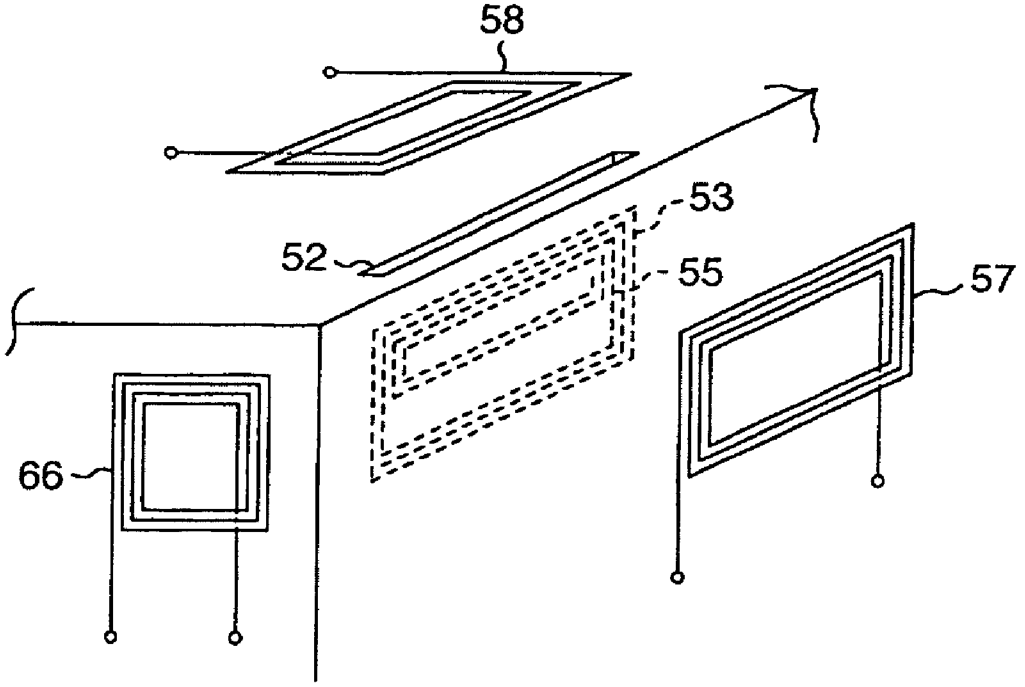
FIG. 14 is a partial perspective view showing the IC module mounted on the accessed object and the direction in which the apparatus-side antenna is making access to the IC module according to a third embodiment of the present invention.
Figure 15:
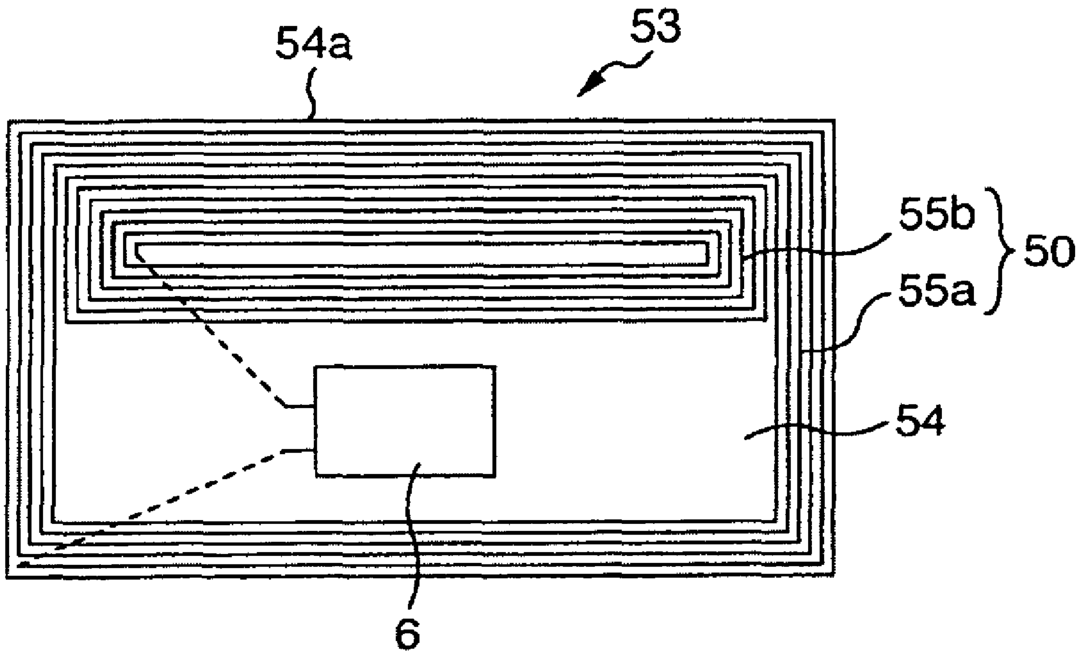
FIG. 15 is a plan view of the non-contact IC module according to the third embodiment in FIG. 14.
Figure 16:
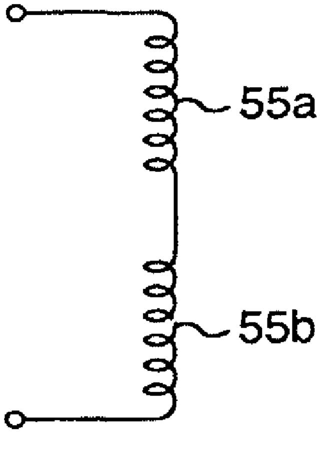
FIG. 16 is a connection diagram of the first and second antennas in the IC module in FIG. 15.

FIG. 14 is a partial perspective view showing the IC module mounted on the accessed object and the direction in which the apparatus-side antenna makes access to the IC module according to a third embodiment of the invention. FIG. 15 is a plan view of the non-contact IC module, and FIG. 16 is a connection diagram of the first and second antennas in the IC module.

As shown in FIG. 14, a slit 52 is formed near the corner portion of the accessed object 51, such as a tape cartridge, and the IC module is inserted into the slit and fixed by appropriate means, such as structural fixing or adhesive.

The IC module 53 is shaped like a tag, and as shown in FIG. 15, it has a module-side coil antenna 55 of aluminum or copper, for example, formed on the surface of a quadrangular hard printed circuit board 54 of glass-epoxy resin, for example, and the antenna 55 is connected at two ends to the IC chip 56 mounted on the printed circuit board 54. The IC chip 56 is molded in resin.

The module-side antenna 55 consists of a large first module-side antenna **55*a* wound in the form of a quadrangular frame to a specified number of turns along the outer periphery of the printed circuit board 54 and a small module-side antenna 55*b* wound in the form of a quadrangular frame to a specified number of turns in an area close to a first side edge 54*a* in the longitudinal direction of the printed circuit board 54. As shown in FIG. 16, the first module-side antenna 55*a* and the second module-side antenna 55*b*** have the same line width and line pitch and form a continuous conductive wiring pattern.

In this example, an IC chip 56 is placed in a free space inside the first module-side antenna **55*a* and by the side of the second module-side antenna 55*b*, and one end of the first module-side antenna 55*a* and one end of the second module-side antenna 55*b* are connected to the IC chip 56**.

The first module-side antenna **55*a*, arranged outside the second module-side antenna 55*b*, comes into face-to-face relation with the first apparatus-side antenna 57 in the first usage mode of the communication apparatus side, such as a personal computer, to communicate with the accessed object 51 to thereby secure an antenna effective area for producing magnetic flux sufficient for information exchange with the communication apparatus. (The first usage mode of the communication apparatus side is that the first apparatus-side antenna 55***a* makes access to the IC module 53 from the front side.)

The second module-side antenna 55*b*, arranged inside the first module-side antenna 55*a*, is provided in a position closer to the second apparatus-side antenna 58 in the access direction different from the access direction of the first apparatus-side antenna 57 in the second usage mode of the communication apparatus side (The second usage mode is that the second apparatus-side antenna 58 makes access to the IC module 53 from one side of the IC module.)

Figure 2:
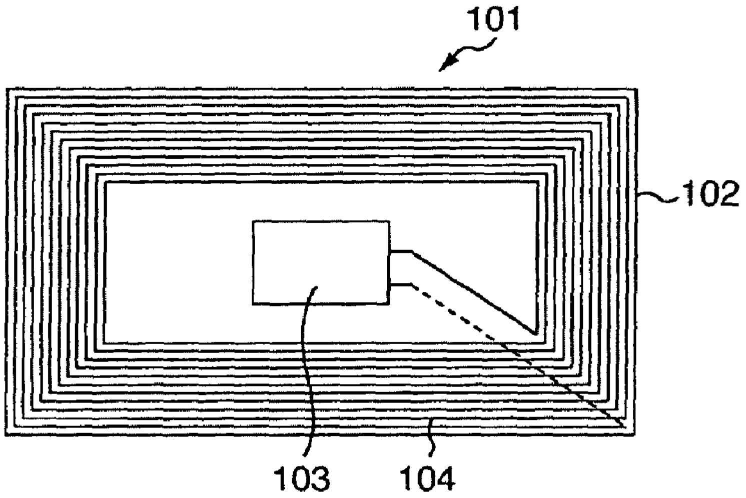
FIG. 2 is a plan view of an IC module used in the accessed object.
Figure 3:
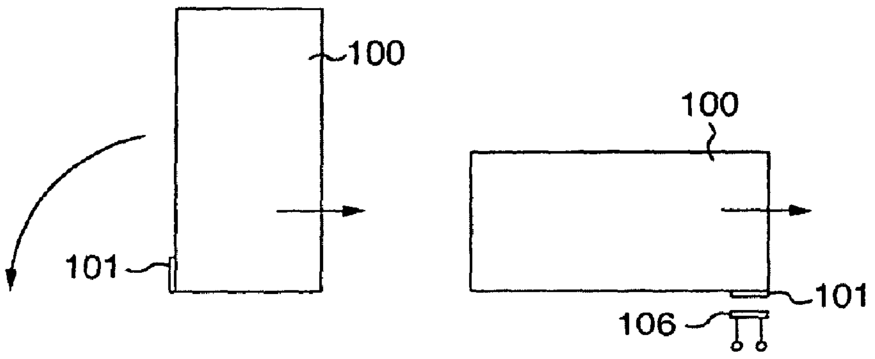
FIG. 3 is an explanatory diagram showing a state that the prior-art accessed object is processed in data processing apparatus.

Therefore, when the total length of the first module-side antenna 55*a* and the second module-side antenna 55*b* is made the same as that of the prior-art module-side antenna 104 (FIG. 2), the amount of magnetic flux produced by each of those two IC modules is the same. However, while the magnetic flux is distributed generally almost evenly in the prior art, the magnetic flux distribution centers in the area closer to the side edge 54*a* of the printed circuit board 54 in the present invention.

Figure 17:
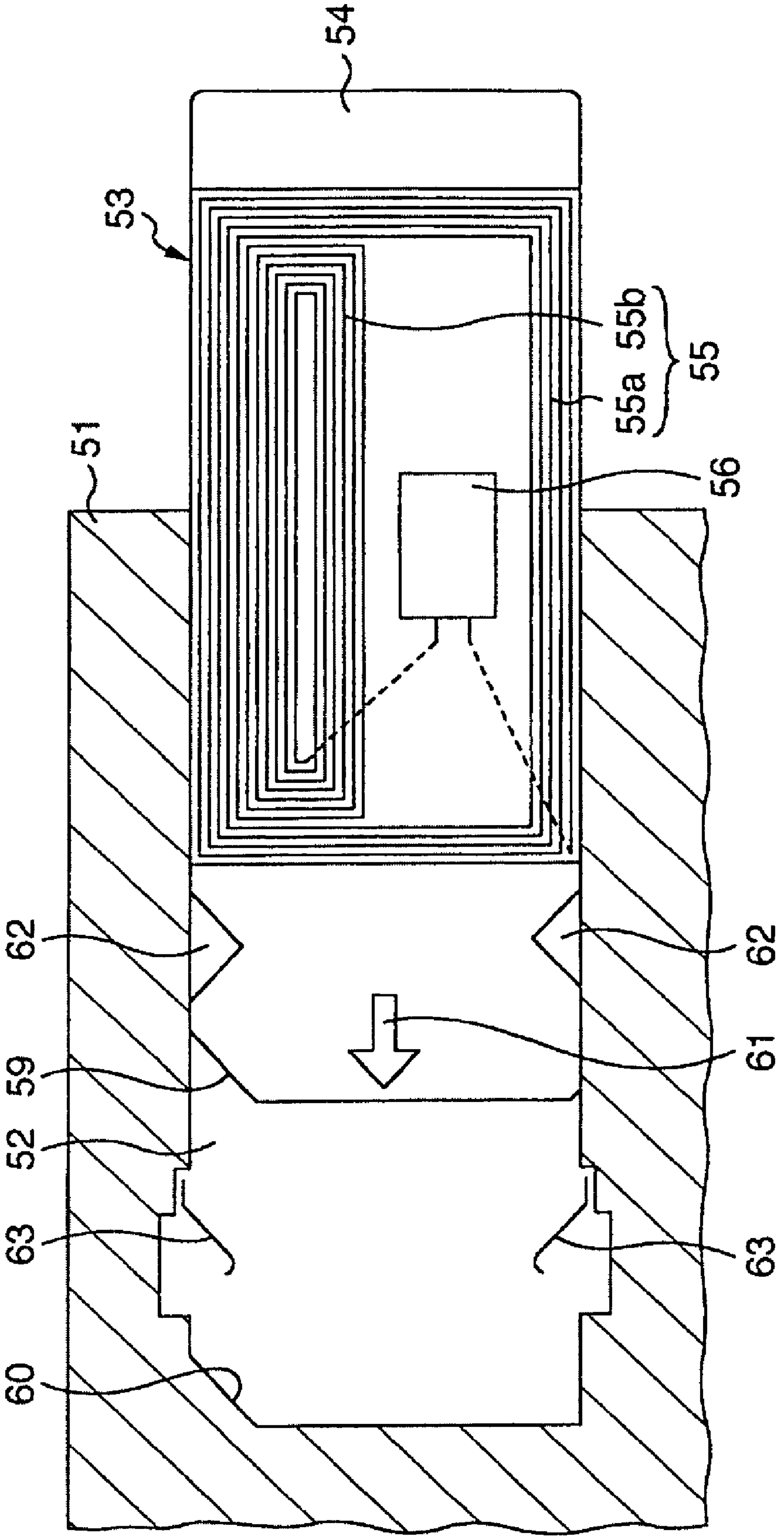
FIG. 17 is a partial sectional view showing the IC module, mounted to the accessed object, according to a fourth embodiment of the present invention.

FIG. 17 shows a fourth embodiment of the present invention. Differences of the fourth embodiment from the third embodiment are that an inclined cut-off portion 59 for preventing erroneous insertion is provided at the leading end of the printed circuit board 54, and that an inclined portion 60, which corresponds to the above-mentioned cut-off portion 59, is formed at the bottom end of the slit 52 of the accessed object 51. Though the inclined cut-off portion 59 and the inclined portion 60 are provided for prevention of erroneous insertion in this example, those portions may be in any other form of engagement, such as by an indentation, projection, groove, or pin.

Further, the erroneous insertion preventive means, which are provided on the printed circuit board 54, are an arrow mark 61 showing the direction of inserting the IC module 53, indentations 62,62 as stoppers, and elastic pieces 63,63 that get into the indentations.

Figure 18:
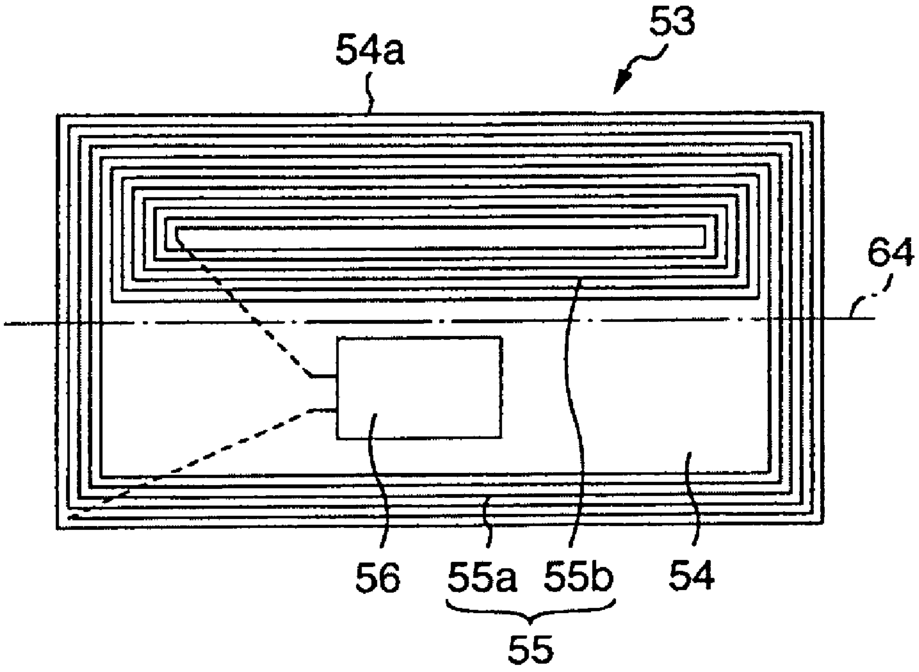
FIG. 18 is a plan view of the IC module according to a fifth embodiment of the present invention.
Figure 19:
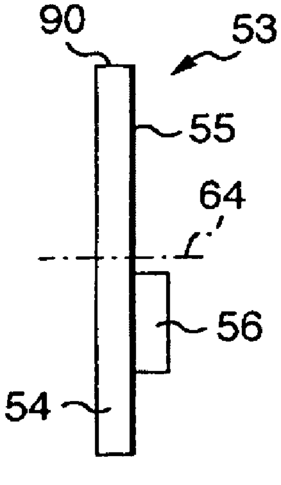
FIG. 19 is a side view of the IC module in FIG. 18.
Figure 20:
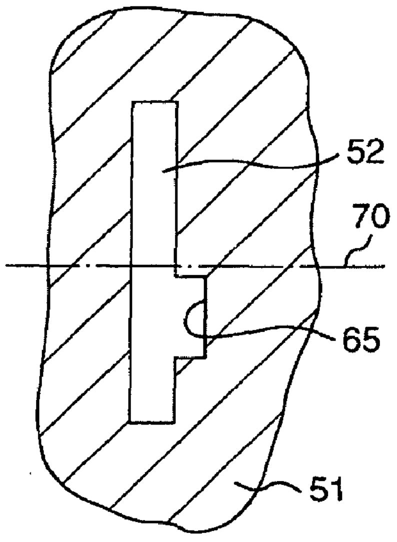
FIG. 20 is a sectional view showing the shape of the slit in the accessed object for insertion of the IC module shown in FIG. 18.

FIGS. 18 to 20 show a fifth embodiment of the present invention. In this example, because the second module-side antenna 55*b* is arranged collectively on one side of a surface of the printed circuit board, the IC chip 56 is offset from the center line 64 of the printed circuit board 54 (FIGS. 18 and 19). By utilizing this arrangement, the IC module 53 is prevented from being inserted in a wrong position.

As shown in FIG. 20, in the opening of the slit 52 formed in the accessed object 51, an IC chip passage 65 is created at a position corresponding to the IC chip 56, that is, at this position offset from the center 70 of the slit 52. For this reason, the IC module 53 can be inserted without making a mistake about the inserting direction of the IC module 53, more specifically, about the position of the second module-side antenna 55*b*.

Figure 21:
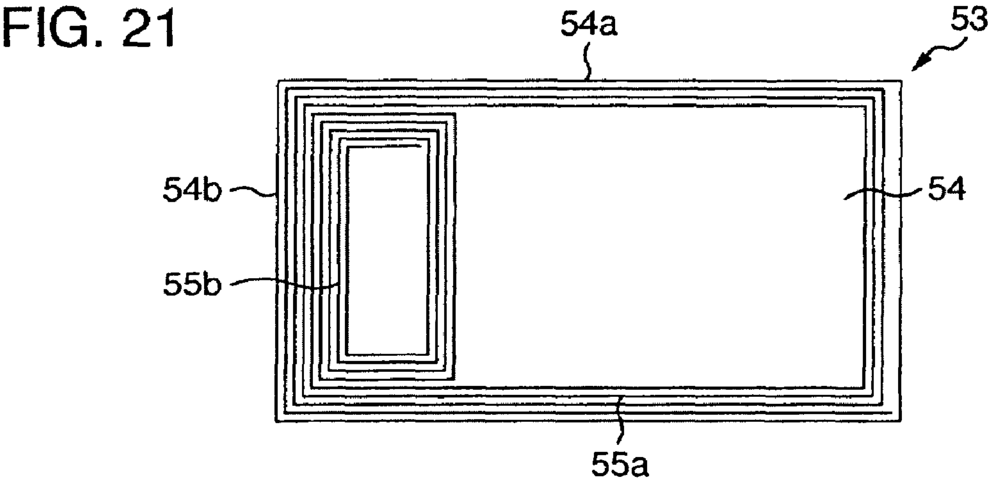
FIG. 21 is a plan view of the IC module according to a sixth embodiment of the present invention.

FIG. 21 is a diagram showing a sixth embodiment of the present invention. In this example, the second module-side antenna 55*b* is provided close to the second side edge 54*b* lying at a right angle to the first side edge 54*a* of the printed circuit board 54. In this example, as shown in FIG. 14, the module-side antenna 55*b* can be accessed by the first apparatus-side antenna 57 and the third apparatus-side antenna 66. Note that the IC chip 56 on the printed circuit 54 is omitted in FIG. 21 and thereafter for simplicity of drawings.

Figure 22:
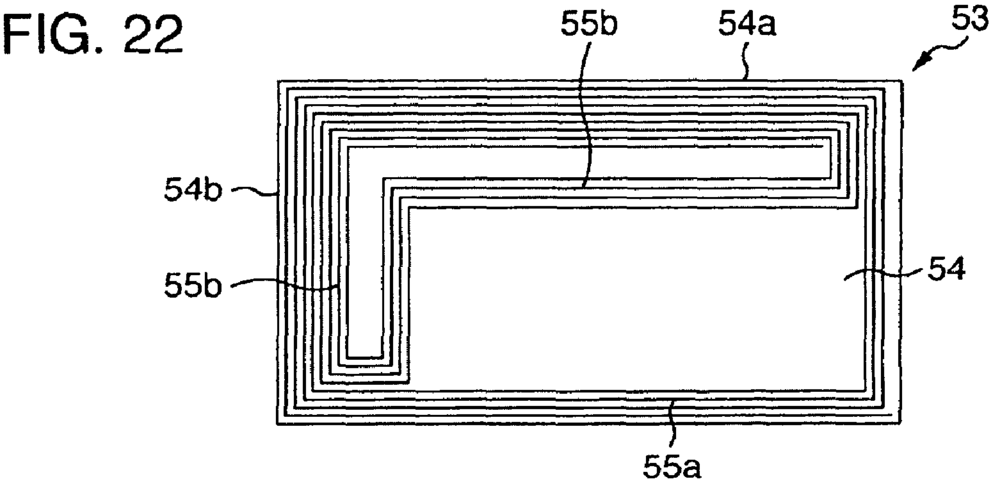
FIG. 22 is a plan view of the IC module according to a seventh embodiment of the present invention.

FIG. 22 is a diagram showing a seventh embodiment of the present invention. In this example, the second module-side antenna 55*b* is provided in L shape in an area close to the first side edge 54*a* and the second side edge 54*b* on the printed circuit board 54. In this example, as shown in FIG. 14, the second module-side antenna 55*b* is accessible from three directions by the first antenna 57, the second antenna 58 and the third antenna 66 all on the apparatus side.

Figure 23:
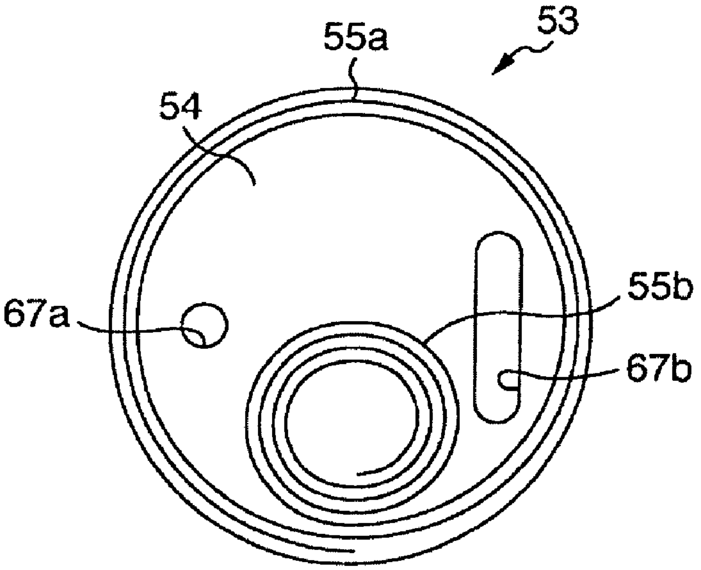
FIG. 23 is a plan view of the IC module according to an eighth embodiment of the present invention.
Figure 24:
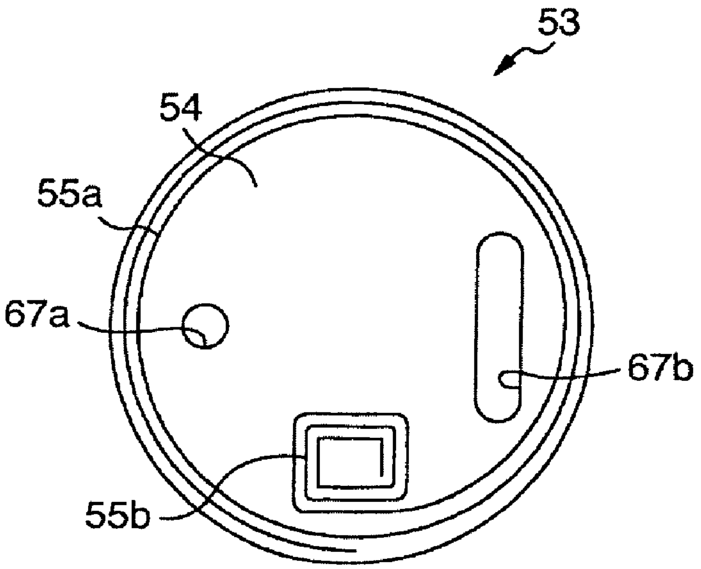
FIG. 24 is a plan view of the IC module according to a ninth embodiment of the present invention.

FIGS. 23 and 24 show eighth and ninth embodiments of the present invention. In those examples, the tag-type IC module is circular in shape. In the eighth embodiment shown in FIG. 23, a second module-side antenna 55*b* in circular form is provided in an eccentric position inside the first module-side antenna 55*a* wound circularly. In the ninth embodiment shown in FIG. 24, the second module-side antenna 55*b* is non-circular in shape (a quadrangle in this example, but its shape may be any other polygon).

As shown in FIGS. 23 and 24, a round hole 67*a* and an elliptic hole 67*b* are formed as a pair on the printed circuit board 54. A mounting recess deeper than the thickness of the printed circuit board 54 at the IC-module-installed position of the accessed object, not shown. In that recessed space, there are formed a round projection to fit into the round hole 67*a* and an elliptic projection to fit into the elliptic hole 67*b*. When the IC module is mounted to the accessed object 51, those projections are fitted into the holes 67*a* and 67*b*, with the result that the second module-side antenna 55*b* is disposed in a specified direction and thus the IC module is prevented from being inserted the wrong way.

Figure 25:
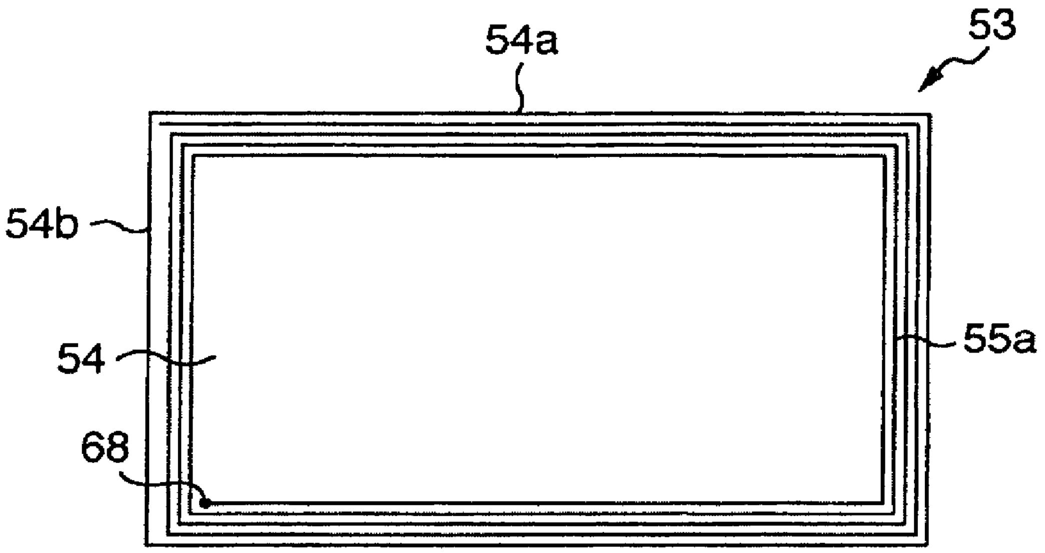
FIG. 25 is a plan view of the IC module according to a tenth embodiment of the present invention.
Figure 26:
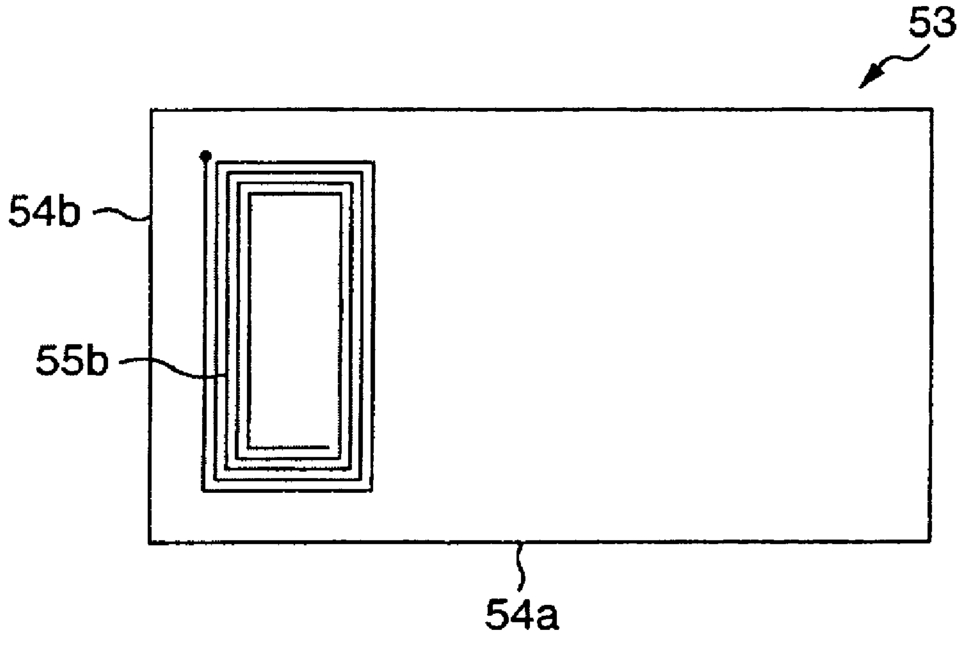
FIG. 26 is a rear view of the IC module shown in FIG. 25.

FIGS. 25 and 26 show a tenth embodiment of the present invention. In this example, the first module-side antenna 55*a* is formed wound in the form of a quadrangular frame generally along the periphery of the surface of the printed circuit board 54 as shown in FIG. 25. On the rear side of the printed circuit board 54, the second module-side antenna 55*b* is formed in the area close to the second side edge 54*b* of the printed circuit board 54 as shown in FIG. 26. The first module-side antenna 55*a* is continuous with the second module-side antennas 55*b* via a through-hole 68. If the printed circuit board 54 were seen through, the first module-side antenna 55*a* and the second module-side antenna 55*b* have the same winding direction.

In this example, the second module-side antenna 55*b* is located close to the second side edge 54*b* of the printed circuit board 54, but this antenna 55*b* may be shifted to the first side edge 54*a* or to the area extending from the first side edge 54*a* to the second side edge 54*b*.

Figure 27:
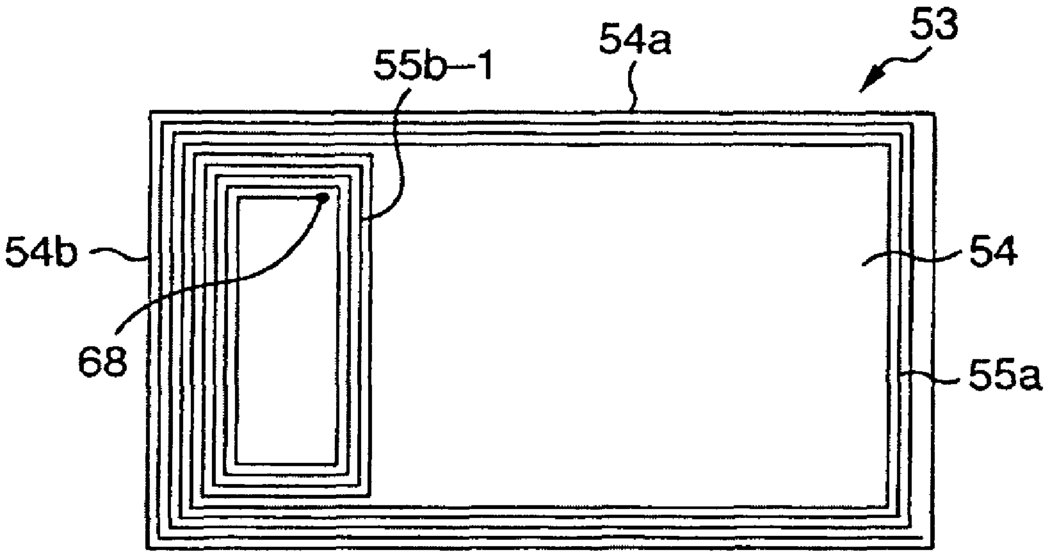
FIG. 27 is a plan view of the IC module according to an eleventh embodiment of the present invention.
Figure 28:
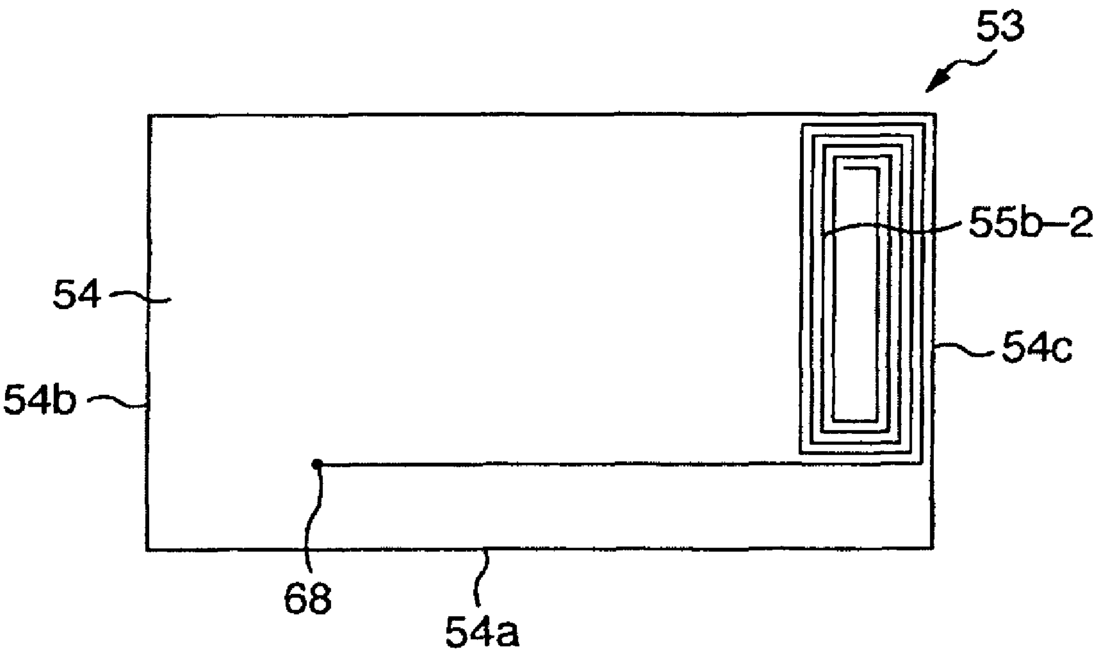
FIG. 28 is a rear view of the IC module shown in FIG. 27.

FIGS. 27 and 28 show an eleventh embodiment of the present invention. In this example, on the front surface of the printed circuit board 54, there are the first module-side antenna 55*a* and one portion 55*b*-1 of the second module-side antenna, located close to the second side edge 54*b*, both formed as shown in FIG. 27. On the rear surface of the printed circuit board 54, there is the other portion of the second module-side antenna 55*b*-2, located close to the third side edge 54*c* opposite from the second side edge 54*b* of the printed circuit board 54 as shown in FIG. 28. The one portion 55*b*-1 and the other portion 55*b*-2 of the second module-side antenna, which are continuous via the through-hole 68, constitute the second module-side antenna 55. If the printed circuit board 54 were seen through, the winding direction is the same for the first module-side antenna 55*a* and the one portion 55*b*-1 and the other portion 55*b*-2 of the second module-side antenna 55.

Figure 29:
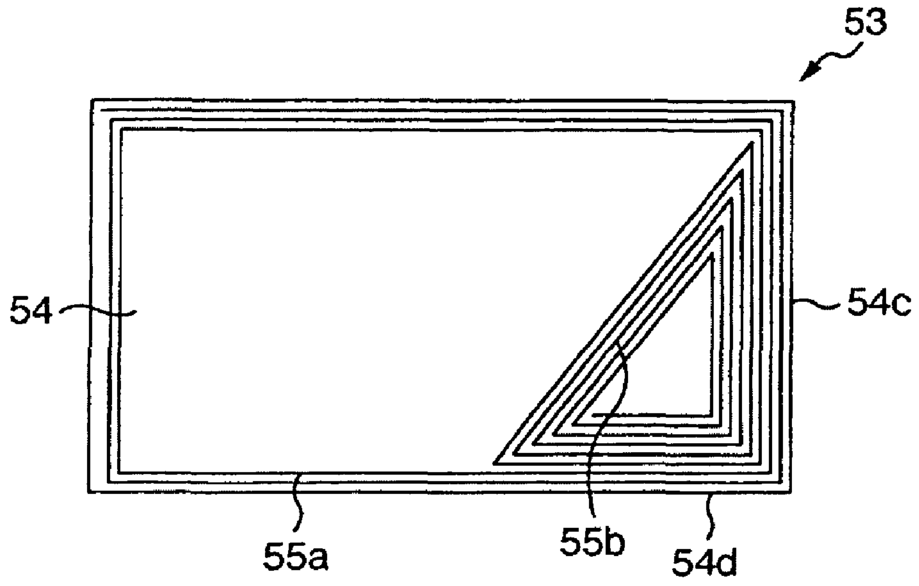
FIG. 29 is a plan view of the IC module according to a twelfth embodiment of the present invention.

FIG. 29 shows a twelfth embodiment of the present invention. In this example, the first module-side antenna 55*a* is formed like a frame extending substantially along the periphery of the printed circuit board 54, and inside the first module-side antenna 55*a*, the second module-side antenna 55*b* is formed in a triangular form extending along the third side edge 54*c* and a fourth side edge 54*d* of the printed circuit board 54.

Figure 30:
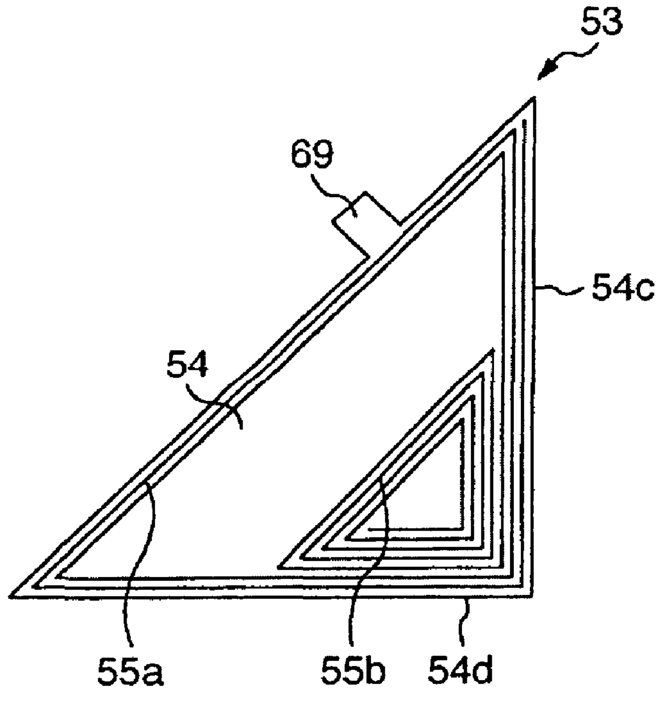
FIG. 30 is a plan view of the IC module according to a thirteenth embodiment of the present invention.

FIG. 30 shows a thirteenth embodiment of the present invention. Differences of this example from the twelfth embodiment are that the printed circuit board 54 is triangular in shape, a projection 69 for erroneous insertion prevention is provided at a position sifted to one side from the mid-point of the hypotenuse, a mounting recess substantially identical in contour with the printed circuit board 54 is formed at the position, where the printed circuit board is mounted, of the accessed object 51, not shown, and the printed circuit board 54 is inserted into the mounting recess, and that the first module-side antenna 55*a* is triangular in shape extending along the periphery of the printed circuit board 54.

The above-mentioned embodiments have been described as using a hard printed circuit board made of a glass-epoxy resin, for example, but the present invention is not limited to this material but may be applied to thin flexible printed circuit boards made of polyethylene polyterephthalate film, polyimide film, for example.

Further, the above-mentioned embodiments have been described as using a tape cartridge as the accessed object, on which an IC module is mounted. However, the present invention is not limited to this application but may be applied to other products or casings for the products, such as optical disk cartridges, disk cartridges, such as a magnetic disk cartridge, toner cartridges, ink ribbon cartridges, battery cell packs, or to other areas, including various test parts, etc.

According to the present invention, in an accessed object having a non-contact IC module including a semiconductor device and a module-side antenna, the module-side antenna consists of the first module-side antenna and the second module-side antenna continuous to the first module-side antenna, the first module-side antenna secures a necessary antenna effective area by coming into face-to-face relation with the first apparatus-side antenna in the first usage mode of the communication apparatus side to communicate with the accessed object, and the second module-side antenna is disposed closer to the access direction of the second apparatus-side antenna, which is different from the access direction of the first apparatus-side antenna in the second usage mode of the communication apparatus side.

According to the present invention, the second module-side antenna is shifted to the second apparatus-side antenna, for which reason the coupling efficiency is raised between the second module-side antenna and the second apparatus-side antenna in conjunction with the magnetic flux distribution and it becomes possible to read or write information. Therefore, the module-side antenna is accessible from a plurality of directions without changing the posture of the accessed object, resulting in improved operation reliability and handlability.

According to the present invention, an insertion recess is provided at a specified position on the accessed object and the non-contact IC module is inserted into the insertion recess; therefore, the IC module, particularly, the second module-side antenna is secured in the specified position, by which the operation reliability can be improved.

According to the present invention, when the insertion recess is a slit, the IC module can be loaded securely in a narrow (thin) portion of the accessed object.

Further, according to the present invention, the erroneous insertion preventive means is provided both at the insertion recess and the non-contact IC module; therefore, the second module-side antenna can be set securely in the specified position (direction), which contributes to improvement of the operation reliability.

Further, according to the present invention, the non-contact IC module uses a printed circuit board, the first module-side antenna is provided on one surface of the printed circuit board, the second module-side antenna is provided on the reverse surface of the printed circuit board and the first module-side antenna is continuous to the second module-side antenna via a through-hole; therefore, it is possible to make use of two sides of the printed circuit board, which offers advantages of reducing the size of the printed circuit board and increasing flexibility in design of the second module-side antenna.

According to the present invention, the non-contact IC module uses a printed circuit board, the first module-side antenna and one part of the second module-side antenna are provided on one surface of the printed circuit board, the other part of the second module-side antenna is provided on the other part of the printed circuit board, and the one part of the second module-side antenna on the one surface of the printed circuit board is continuous to the other part of the second module-side antenna on the other surface; therefore, which enables a further reduction in size of the printed circuit board and improves flexibility in design of the second module-side antenna.

According to the present invention, when the accessed object is an information recording medium, it is easy to processes such as searching and managing information recording media by the use of radio communication antennas.

What is claimed is:

1. An accessed object comprising:

a non-contact IC module including an IC chip and a radio communication antenna coil connected to said IC chip, wherein said radio communication antenna coil is a continuous conductive wiring pattern extending over two surfaces of different directions of said accessed object, and wherein said IC chip is inside the radio communication antenna coil, and wherein said IC module is bent at almost midportion.

2. An accessed object according to claim 1, wherein said IC chip and said radio communication antenna coil are formed on a flexible sheet, and wherein said sheet is bent substantially at a right angle and attached to said accessed object.

3. An accessed object according to claim 2, wherein said IC chip is provided in that position of said sheet which is away from the bent portion thereof.

4. An accessed object according to claim 1, wherein said radio communication antenna coil is provided in the vicinity of a corner portion of the said accessed object.

5. An accessed object according to claim 1, wherein said accessed object has a casing and said radio communication antenna coil is provided inside said casing.

6. An accessed object according to claim 5, wherein said casing is opaque or translucent.

7. An accessed object according to claim 1, wherein said accessed object is holding an information recording medium.

8. An accessed object comprising:

a non-contact IC module including an IC chip and a radio communication antenna coil connected to said IC chip, wherein said radio communication antenna coil is a continuous conductive wiring pattern extending over two surfaces of different directions of said accessed object, and wherein said IC chip is inside the radio communication antenna coil, and wherein said IC module is bent.

9. An accessed object according to claim 8, wherein said IC chip and said radio communication antenna coil are formed on a flexible sheet, and wherein said sheet is bent and attached to said accessed object.

10. An accessed object according to claim 9, wherein said IC chip is provided in that position of said sheet which is away from the bent portion thereof.

11. An accessed object according to claim 8, wherein said radio communication antenna coil is provided in the vicinity of a corner portion of the said accessed object.

12. An accessed object according to claim 8, wherein said accessed object has a casing and said radio communication antenna coil is provided inside said casing.

13. An accessed object according to claim 12, wherein said casing is opaque or translucent.

14. An accessed object according to claim 8, wherein said accessed object is holding an information recording medium.

* * * * *